United States Patent [19]
Harkin et al.

[11] Patent Number: 5,999,200
[45] Date of Patent: Dec. 7, 1999

[54] METHOD AND APPARATUS FOR AUTOMATICALLY CONTROLLING THE DESTINATION OF A GRAPHICS COMMAND IN A REGISTER FILE

[75] Inventors: Patrick A. Harkin, Austin, Tex.; Michael K. Larson, Kirkland, Wash.

[73] Assignee: Cirrus Logic, Inc., Fremont, Calif.

[21] Appl. No.: 09/012,333

[22] Filed: Jan. 23, 1998

[51] Int. Cl.⁶ .................................................. G06F 15/00
[52] U.S. Cl. ........................... 345/522; 345/513; 345/515
[58] Field of Search .................................... 345/513, 522, 345/507–509, 501, 515, 516

[56] References Cited

U.S. PATENT DOCUMENTS

| | | | |
|---|---|---|---|
| 5,657,479 | 8/1997 | Shaw et al. | 345/526 |
| 5,675,773 | 10/1997 | Devic | 345/522 |
| 5,706,478 | 1/1998 | Dye | 345/503 |
| 5,793,386 | 8/1998 | Larson et al. | 345/522 |

*Primary Examiner*—Kee M. Tung
*Attorney, Agent, or Firm*—Robert V. Wilder; Steven A. Shaw

[57] ABSTRACT

A graphics system includes a graphics processor for rendering graphics primitives with a list of display parameters. A host processor generates a display list which includes a XY address for rendering the graphics primitives. A graphics processor which includes a command address feed logic device decodes the display list to determine the register locations in a register file to fill with data. The command address feed logic device decodes the display list and orders a group of registers in the register file in order to perform a sequential write to the register file. By sequentially ordering the register file locations, the command address feed logic device is able to write null or zero data values to the register locations which are not needed to render a primitive, while maintaining a single write cycle to the register file.

6 Claims, 5 Drawing Sheets

METHOD AND APPARATUS FOR AUTOMATICALLY CONTROLLING THE DESTINATION OF A GRAPHICS COMMAND IN A REGISTER FILE

FIELD OF THE INVENTION

The present invention relates generally to information processing systems and more particularly to an improved graphics system for use with computer systems.

BACKGROUND OF THE INVENTION

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that provide an interface between a host central processing unit and graphics processors. In general, the graphics software receives information for drawing objects on a computer screen, calculates certain basic parameters associated with the objects and provides input to the graphics processor in the form of a "display list" of parameters.

A graphics processor then uses the display list values in generating the graphics objects to be displayed. The graphics processor may use interpolation techniques where the fundamental information for the object to be drawn comprises a series of initial and incremental parameters or values. The graphics processor loads or otherwise receives the initial parameters for the pixels to be drawn, and interpolates to draw the object by incrementing the parameters until the object is completely drawn.

Existing graphics implementations that use display lists typically load data in a sequential format to a register file in the graphics processor. For each type of primitive, a particular set of data values is required to render that type of primitive. For example, a point to be drawn to a pixel grid may require an "x,y" location, color value, and a "z" or depth value for depth comparison. Conversely, if the primitive is a line, the parameters required may also include a slope to describe the line's direction in the x direction, and a count value to define the length in the y direction.

An example of a display list is shown below in Table 1:

TABLE 1

| ADDRESS | NAME | DESCRIPTION |
|---------|------|-------------|
| 0X4000  | X    | Initial X value |
| 0X4004  | Y    | Initial Y value |
| 0X4008  | R    | Initial Red value |
| 0X400C  | G    | Initial Green value |
| 0X4014  | B    | Initial Blue value |
| 0X4044  | Z    | Initial depth value |

The display list provides the parameters required to draw points, lines, and polygons. The display list provided from the central processor or from memory provides data for the various registers in the register file. The display parameter values are processed by the graphics processor to render the corresponding graphics objects.

Furthermore, not all the values available to define a primitive type are necessarily used to render a particular primitive. When executing a display list instruction, it is often necessary that only certain incremental data be present for execution after the initial primitive parameter data values have been executed (e.g. in a graphics system a draw point instruction may only require a x, y and color value). In prior art systems, if a primitive to be rendered does not require a particular parameter, then the register is skipped on a subsequent write operation by the graphics processor without any primitive value being loaded into the corresponding register in the register file. The disadvantage of only writing the necessary data is that the addresses are usually not sequential which causes the transfer by write operations over the system bus to the graphics subsystem to be slow.

The skipping of registers in the register file values for a primitive being rendered increases the amount of memory required to store the parameters. Such register skipping also increases the amount of time required to load register files in the graphics processor and also the volume of transactions on the system bus and the internal graphics processor bus during each stage of the rendering process.

Typically, in a register skipping scheme, the display list will include instructions requesting the graphics processor to skip certain registers in the register file after the initial primitive parameter values have been loaded into the register file. If during the rendering of the primitive, new incremental address values are required to complete the rendering of the primitive, an incremental X value may be stored in register A, an incremental Y value may be stored in register B and an incremental color value may be stored in register E. Thus, to write the register file, the graphics processor has to write to registers A, B and E respectively with the incremental primitive values.

Since the group of registers to be written with the incremental primitive values are not sequentially grouped, the graphics processor writes registers A and B and skips registers C and D on subsequent write cycles before writing to register E. In such a register skipping scheme, the graphics processor writes a series of address-data, address-data, address-data sequences in a non-consecutive manner to fill the register file.

Skipping registers C and D causes write operations in the graphics processor to slow down data access on the system bus and in effect substantially affect the bus bandwidth. As a result, the rendering operation requires more memory space, and takes more time than it would if the register skips were eliminated. It would be advantageous, therefore, if a graphics system were developed which could eliminate register skipping during a write operation of parameters during register loading and rendering of a graphics primitive.

It would be further advantageous if the host processor could transmit parameter values as part of the display list in a sequential group of registers which would allow the graphics processor to sequentially write to the register file regardless of whether a particular register contains data, without incurring any extra write or clock cycles.

Thus, an improved method of reducing the memory bandwidth of the graphics processor while rendering graphics primitives such as polygons within the graphics subsystem while maintaining the processing speed of CPU is needed.

SUMMARY OF THE INVENTION

The above and other needs are substantially met through provision of a method and a system for automatically controlling the destination of graphics primitive parameter command values in a register file based on the particular command.

Primitive parameter values are generated by software in a host processor and are provided to the graphics processor in the form of a display list. The display list includes operational code (opcode) instructions which indicate the type of command to be performed and the associated display data. In a preferred embodiment, the graphics processor includes an instruction prefetch unit for fetching the display list either directly from the host processor or form system memory through a read operation. The graphics processor also includes an execution unit which includes the register command feed logic for receiving the display list and decoding the opcode instructions to determine the type of instruction to perform to render the primitive.

In a preferred embodiment, the execution unit, as part of the display list opcode decoding, determines the type of primitive that is to be rendered and allows write operations of data to the register file for commands to be sequentially ordered while only filling the necessary registers with the required data values in order to effectively utilize the graphics processor's bus bandwidth. Incoming primitive parameter data are monitored after a current primitive has been rendered, to determine whether to write sequential register locations in the register file. The execution unit includes an address command address feed logic circuit which includes a command register for receiving the address values of the primitive parameter data presented to the execution unit. A "lookup table" in the address command address feed logic circuit stores the incremental address values to allow the command feed logic circuit determine whether to write to a particular register file location or skip that particular location. By selectively writing data to register file locations, the rendering engine in the graphics processor will not have to read each register file location to determine whether there is any data stored in that particular location.

An address decoder in the command address feed logic of a preferred embodiment decodes incoming opcode instruction in the incoming graphics command to automatically determine and control the sequence of register filling in the register file. Thus, "writes" to the register file will be in a "instruction-data-data-data" sequence or format depending on the number of registers to be filled with data. Such a data write format allows the graphics processor to perform consecutive writes to the register file in a single write operation without incurring any extra clock cycles.

Accordingly, the graphics processor of the preferred embodiment is able to determine which registers in the register file to write with new display list data while rendering a graphics primitive internally in order to speed up X and Y pixel address fetches to render a polygon in a single clock cycle. The present invention provides the advantageous functionality of a graphics processor capable of internally grouping register writes into a sequential write operation to perform a continuos write to a register file with a given display list instructions without having to skip registers. Thus the present invention eliminates the load of unnecessary parameter value data as a graphics primitive is being rendered.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

In the following detailed description, numerous specific details are set forth in order to provide a thorough understanding of the present invention. However, it will be obvious to one skilled in the art that the present invention may be practiced without these specific details by using alternate elements or methods. In other instances well known methods, procedures, components, and circuits have not been described in detail so as not to unnecessarily obscure significant aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, signals capable of being stored, transferred, combined, compared, and otherwise manipulated in a computer system. For reasons of convenience, and with reference to common usage, these signals are referred to as bits, values or the like with reference to the present invention.

Unless specifically stated otherwise, as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
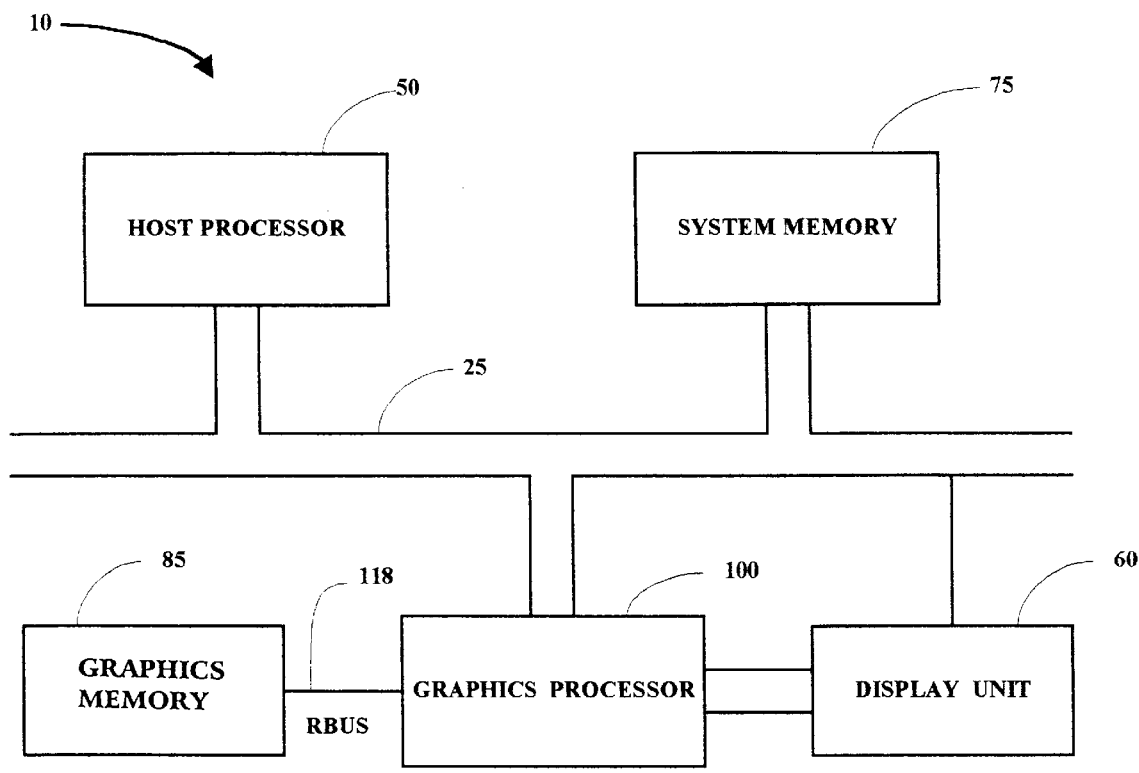
FIG. 1 is a simplified block diagram of a computer system having a graphics processor in accordance to the teaching of the present invention.

With reference to FIG. 1, a block diagram is shown of a host computer system 10 used by the preferred embodiment of the present invention. In general, host computer 10 comprises a bus 25 for communicating data and instructions, a host processor (CPU) 50 coupled to bus 25 for processing data and instructions, a computer readable memory unit 75 coupled to bus 25 for storing data and instructions from the host processor 50.

The host processor 50 provides data and control. signals via bus 25 to a graphics hardware subsystem. The computer system 10 includes a graphics processor 100 which executes a series of display instructions found within a display list. The graphics processor 100 supplies data and control signals to a frame buffer or graphics memory 85. The graphics memory 85 is implemented for refreshing screens of a display device 60. The display device 60 utilized with the computer system 10 of the present invention can be a liquid crystal device (LCD), cathode ray tube (CRT), virtual retina display (VRD) or other display device suitable for creating graphics images and alphanumeric characters recognizabLe to the computer user.

The particular embodiment shown in FIG. 1 is only one of many possible implementations of a graphics system for use in a computer system. FIG. 1 is simplified for purposes of clarity so that many components and control signals are omitted which are not necessary to acquire an understanding of the present invention. In FIG. 1, the graphics processor 100 provides hardware support for 2D and 3D graphics, and for text and windowing operations of a computer system. The graphics processor 100 transfers digital data from the system memory 75 or host processor 50, and processes data for storage in the graphics memory 85 ultimately for display on the display unit 60. Graphics memory 85 in the present example, is a RAMBUS type dynamic random access memory device (RDRAM). The host processor 50 and system memory 75 both preferably communicate with the graphics processor 100 via the system bus 25. The system bus 25 may be, for example, the peripheral component interconnect or so called "PCI" bus.

Still referring to FIG. 1, the graphics processor 100 includes bus-mastering capabilities, thus permitting graphics processor 100 to bus-master the system bus 25. The RDRAM graphics memory 85 comprises a bank of RDRAM buffers, and the digital data stored in the RDRAM comprises a rectangular array of picture elements referred to as "pixels" or "pixel values". Each pixel can be defined by an 8 bit value. For example, the intensity of a single color component of a corresponding pixel on a screen of the display unit 60 is typically defined by an 8 bit value. The RDRAM graphics memory 85 provides a performance improvement by permitting faster access to display list instructions and pixel data, compared to accessing data stored in the main memory 75 of the host computer system 10. The graphics processor 100 communicates to the RDRAM graphics memory 85 through address, data and control lines, collectively referred to as an RBUS 118.

Figure 2:
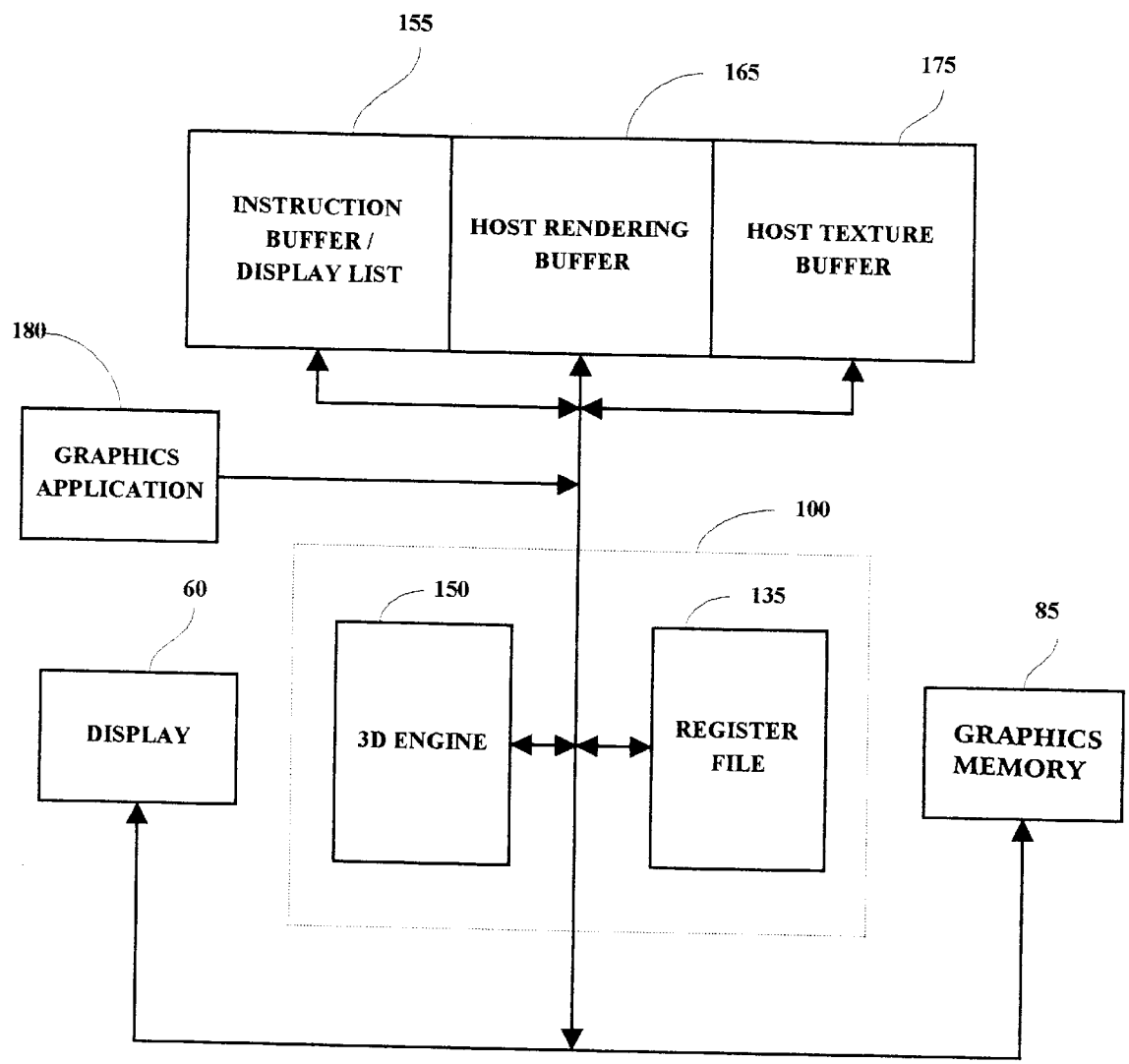
FIG. 2 is a simplified block diagram showing in some detail portions of the graphics processor of FIG. 1, including a bus-mastering unit.

Referring now to FIG. 2, the graphics processor 100 preferably includes a register file 135 and a 2D/3D engine 150 for generating three and two dimensional primitives. The system shown in FIG. 2 includes an instruction buffer 155, a host rendering buffer 165 and a host texture buffer 175. Buffers 155,165 and 175 store the instructions and parameters generated by the graphics application 180. As one skilled in the art will understand, buffers 155, 165 and 175 may reside in the processor 50 or system memory 75 of FIG. 1.

The register file 135 receives the instructions and display information from buffer 155 for subsequent use by the 2D/3D engine 150. The 2D/3D engine 150 receives the instructions and display parameters from the register file 135 and generates values for each pixel for rendering on display unit 60. The 2D/3D engine 150 stores the pixel data internally in the graphics processor 100 before rendering the pixels to display unit 60 or to the RDRAM graphics memory 85.

Figure 3:
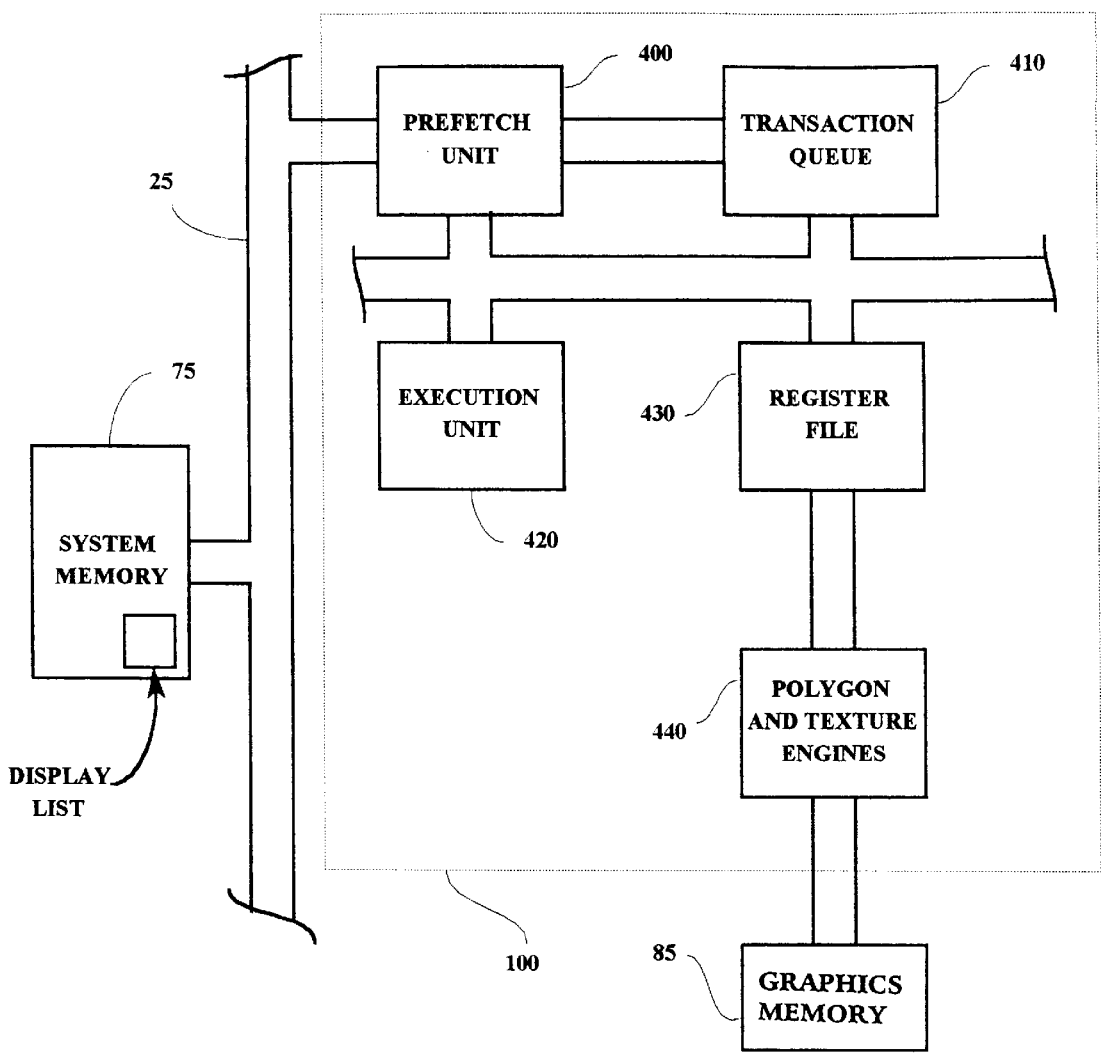
FIG. 3 is a simplified block diagram showing additional detail of the graphics processor of FIG. 2.

Referring now to FIG. 3, the graphics processor 100 preferably includes a prefetch unit 400 coupled to a execution unit 420, a transaction queue unit 410, a register file 430 and polygon and texture engines 440. The prefetch unit 400 provides interface to the system bus 25. Generally, the prefetch unit 400 fetches instructions and the display list and loads the information into the transaction queue unit 410 while the polygon and texture engines 440 are drawing previously fetched instructions.

When the graphics processor 100 is in a bus master mode, the prefetch unit 400 generates the system bus address for reading the display list from system memory 75 and then preferably fills the transaction queue 410 with the display list instructions and display list data. The prefetch unit 400 also includes logic for enabling the graphics processor 100 to arbitrate for control of the system bus 25.

The execution unit 420 under the direction of the prefetch unit 400 transfers the contents of the transaction queue 410 to the register file 430 for rendering by the polygon and texture engines 440. The execution unit 420 generally functions to set the control states for the graphics processor 100, and further synchronize operations of the graphics processor subcomponents. In a preferred embodiment as long as the graphics memory 85 is available, the execution unit 420 is assigned the highest priority by the arbitration logic in the transaction queue 410. Thus, the execution unit 420 is not interrupted while executing an instruction. The execution unit 420 is typically placed in an IDLE mode between each "render" instruction. In addition, the execution unit 420 suspends operation when a current executing instruction requires data from the system bus 25 or system memory 75. The execution unit 420 also includes a command feed logic circuit to handle display list instructions provided by the prefetch unit 400.

Still referring to FIG. 3, the register file 430 generally comprises registers for values necessary to render any primitive. Thus, to load a display list value into the appropriate registers in the register file 430, each value in the display list has an associated address corresponding to a register in the register file 430. Once a set of display list values from the transaction queue 410 is loaded into the register file 430, the primitive defined by those values is rendered by the polygon and texture engines 440. While the polygon and texture engines 440 are rendering the current primitive from the register file 430, the prefetch unit 400 may receive a display list corresponding to the next primitive to be rendered and, if so, loads the display list into the transaction queue 410.

Figure 4:
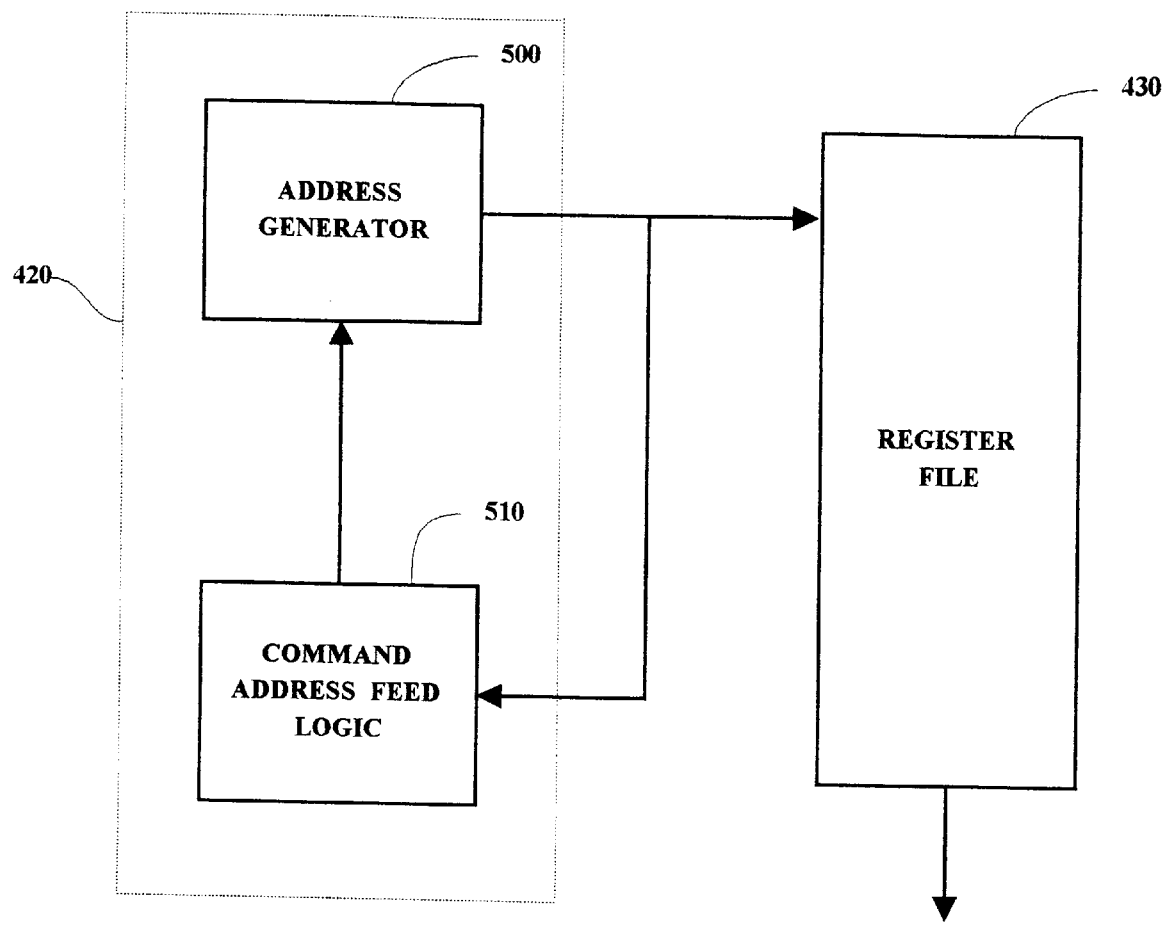
FIG. 4 is a block diagram showing portions of the execution unit of FIG. 3 including the command address feed logic.

Referring now to FIG. 4, there is shown a simplified block diagram of the execution unit 420. As shown, the execution unit 420 comprises a register address generation unit 500 and the command address feed logic 510. The execution unit 420 may include other elements which are not shown in FIG. 4. The register address generation unit 500 generates ad address pertaining to a register file in response to a display list data parameter and transmits the address to the register file 430. The data in the register at the provided address is then transmitted to the polygon and texture engines 440 to be rendered. Command address feed logic 510 receives an operational code (opcode) instruction which includes the opcode itself and the primitive parameter data. From the opcode instruction, the command feed logic 510 determines which registers in register file 430 to write to with the incoming primitive parameter data for a previously rendered primitive. Unlike prior art devices, the command address feed logic 510 writes the primitive parameter data sequentially to the register file 430 without skipping any registers regardless of whether the display list for the primitive parameter data contains data pertaining to a register location in the register file 430.

Figure 5:
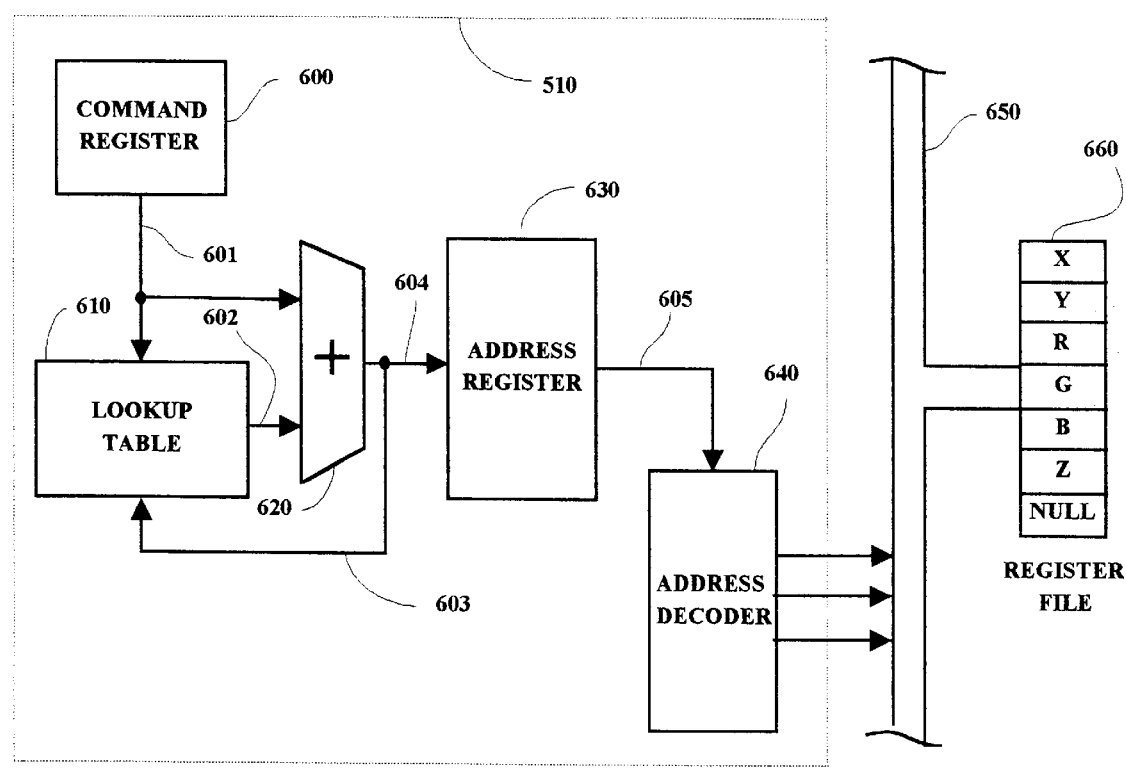
FIG. 5 is a detailed block diagram showing an exemplary embodiment of the command address feed logic of FIG. 4.

FIG. 5 is a simplified block diagram illustration the command address feed logic 510 of FIG. 4. As shown in FIG. 5, the command address feed logic 510 comprises a command register 600 coupled to a lookup table 610, adder logic 620, address registers 630 and address decoder 640. The command register 600 is coupled to receive the opcode instructions and store the instructions. The register 600 also provides the instructions to the address decoder 640 for decoding. The command instruction stored in the command register 600 is transmitted to the lookup table 610 to update the contents of the lookup table.

The lookup table 610 couples to the command register 600 and adder logic 620 to provide incremental primitive parameter data of a primitive being rendered. In the illustrated exemplary embodiment, the lookup table 620 comprises a plurality of registers each about six bits wide in the present example for storing the opcode instructions in the display list. The contents of the lookup table 610 are updated with the contents of the command register 600 after the current primitive being rendered is completed.

Still referring to FIG. 5, the adder logic 620 is coupled to the lookup table 610 and receives as one of its inputs the output of the command register 600 and as the other input, the output of the lookup table 610. In the exemplary embodiment, the adder logic 620 determines the number of register locations to be written with actual data from the display instructions. The output of the adder logic 620 is provided to the address register 630 for storage. The address register 630 comprises a plurality of registers each about 6 bits wide in the present example, and each capable of storing the addresses of the display list instructions which are decoded in the address decoder 640 to sequentially fill the register file 430.

In the present example, the address decoder 640 sequentially writes data to a register file 660 without skipping any register locations. In the illustration, register file 660 includes seven sequential registers hereinafter referred to as registers A through G, respectively. The registers in the present example are arranged to store pixel values for the "X" location, the "Y" location, the red color component "R", the green color component "G", the blue color component "B", and the depth component "Z", respectively, of pixels for primitives to be rendered on a display device. In the illustration shown in FIG. 5, if register location A in the register file is the location for the "X" parameter value of the primitive pixel being rendered, and register location B is the register for the "Y" parameter of the primitive pixel and register location E is the register for the blue component of the color value of the primitive pixel being rendered, and there are no changes to the other parameter values, the programmer would write all registers A, B, C, D and E instead of only registers A, B, and E which contain the actual data values needed by the rendering engine. Even though register locations C and D, for example, are not needed to render the primitive, the command address feed logic of the preferred embodiment inserts null values, which may include zero or other non-actual values, into registers C and D in the execution of the command provided by the prefetch unit in order that a sequential group of writes may be performed to move data more quickly from the system memory to the graphics processor. Even though the writes are sequentially ordered, only the necessary register location e.g., A, B and E are written with any actual data from the display list presented to the command address feed logic 510. Thus, the write sequence will be an instruction-data-data-data-data to fill the registers with the data values. Thus, in the illustrated embodiment, the graphics processor can perform consecutive write cycles to fill the register file with a command instruction without incurring the extra clock cycles which were required in prior art devices.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A command address feed logic device disposed in a graphics processor, said command address feed logic device being selectively operable for performing sequential write operations of a sequence of register locations in a register file, said command address feed logic device comprising:

a command register disposed in the command address feed logic to receive operational code instructions corresponding to graphics primitive parameters for rendering a graphics primitive;

a lookup table coupled to the command register to provide incremental primitive parameters of a primitive being rendered; and an address decoder coupled to the lookup table to decode the primitive parameters provided to the command address feed logic device and to sequentially write to the register file without skipping a register file location.

2. The command address feed logic device of claim 1, and further including an adder logic unit coupled to the lookup table to determine the number of register locations in the register file to be filled with actual primitive parameter data during a single write cycle.

3. The command address feed logic device of claim 2, wherein each write cycle to the register file comprises an operational code instruction followed by a series data values corresponding to the number of register locations to be filled in the register file.

4. The command address feed logic device of claim 3, wherein the lookup table comprises a plurality of registers.

5. The command address feed logic device of claim 4, wherein each of said plurality of registers is six (6) bits wide.

6. The command address feed logic device of claim 5, wherein the address decoder allows writes of data needed for a command corresponding to a graphics primitive being rendered to be sequentially ordered in the register file.

* * * * *